Feb. 26, 1957 H. H. JONES ET AL Re. 24,281

DEGREASING APPARATUS

Original Filed Oct. 15, 1951 2 Sheets-Sheet 1

INVENTORS
HARRY H. JONES & ROBERT C. WHITE
BY
Barnes Kisselle Laughlin & Raisch
ATTORNEYS

DEGREASING APPARATUS

Original Filed Oct. 15, 1951 2 Sheets-Sheet 2

INVENTORS
HARRY H. JONES & ROBERT C. WHITE
BY
Barnes Kisselle Laughlin & Raisch
ATTORNEYS United States Patent Office Re. 24,281
Reissued Feb. 26, 1957

24,281

DEGREASING APPARATUS

Harry H. Jones, Huntington Woods, and Robert C. White, Detroit, Mich., assignors, by mesne assignments, to Robert C. White, doing business as Manufacturers Process Co.

Original No. 2,662,851, dated December 15, 1953, Serial No. 251,334, October 15, 1951. Application for reissue December 12, 1955, Serial No. 552,688

11 Claims. (Cl. 134—65)

Matter enclosed in heavy brackets [ ] appears in the original patent but forms no part of this reissue specification; matter printed in italics indicates the additions made by reissue.

This invention relates generally to apparatus for treating articles of manufacture with a solvent vapor, and refers more particularly to equipment for cleaning or degreasing metal parts by the condensing action of a solvent vapor on the surfaces of the parts.

In the manufacture of various types of articles, and particularly metal parts which become contaminated with lubricants or oily substances during fabrication, it is frequently necessary to thoroughly clean the parts before the latter are shipped to the consumer or user of the parts. The equipment available for cleaning such parts on a production basis ordinarily comprises apparatus having among other things a chamber into which a vapor solvent is either introduced or is created by boiling the solvent in its liquid state within the chamber. Where the parts to be treated or cleaned are relatively small, such for example, as nuts, bolts, washers and the like, a relatively simple, compact degreasing apparatus is preferred.

In the interests of simplicity, the degreasing chamber of the apparatus is usually open at the top in order to permit lowering a basket or other support containing the parts to be cleaned into the chamber through the open top of the latter. As the parts are lowered through the vapor atmosphere in the chamber, the solvent is condensed on the surfaces of the parts; and grease, lubricant or any other oily substance on the surfaces of the parts is dissolved. The basket containing the parts is then withdrawn from the chamber through the open top of the latter, and if desired may be sprayed with a liquid solvent while being withdrawn from the chamber. In small degreasing units of the above general type, the articles to be cleaned are manually introduced into and removed from the vaporizing chamber, since the overall size of the chamber is not conducive to employing conveying equipment.

With the above in view, it is an obpect of this invention to provide work handling equipment of a nature rendering it possible to install the same within a vaporizing chamber of a small degreasing unit without enlarging, or in fact, materially modifying the standard construction of the unit. In accordance with this invention the articles or work parts to be cleaned are introduced into the vaporizing chamber by a feeding device including a hopper, and are elevated from a zone below the vapor level in the chamber through the top of the latter by a vertical spiral conveyor of the vibrating type.

It is another object of this invention to provide means in the vaporizing chamber for spraying a liquid solvent on the articles as the latter are elevated by the spiral conveyor.

The installation of a spiral conveyor of the vibrating type in the vaporizing chamber of a degreasing unit assures a steady and continuous flow of work parts into and out of the vaporizing chamber. As a result heavy periodical loads are eliminated, and a more uniform temperature of the vapor solvent is maintained. Moreover, due to the nature of the conveyor, little or no upkeep is required, because sprockets, shafts, chains or equivalent parts and their associated lubricating problems are eliminated. In this connection it is also important to note that baskets or other work holding equipment may also be eliminated, and this possibility further assists in maintaining the vapor solvent at a uniform temperature with a minimum loss of heat.

The vibratory action of the conveyor not only serves to continuously feed work articles out of the vaporizing chamber as stated above, but in addition, serves to dislodge chips, foreign matter, or excess solvent from the parts as they are elevated through the top of the chamber. Moreover by virtue of the vibrating action of the conveyor, the parts are agitated as they pass through the vapor phase; and this motion improves or expedites cleaning of the parts.

The foregoing as well as other objects will be made more apparent as this description proceeds, especially when considered in connection with the accompanying drawings, wherein.

Figure 1:
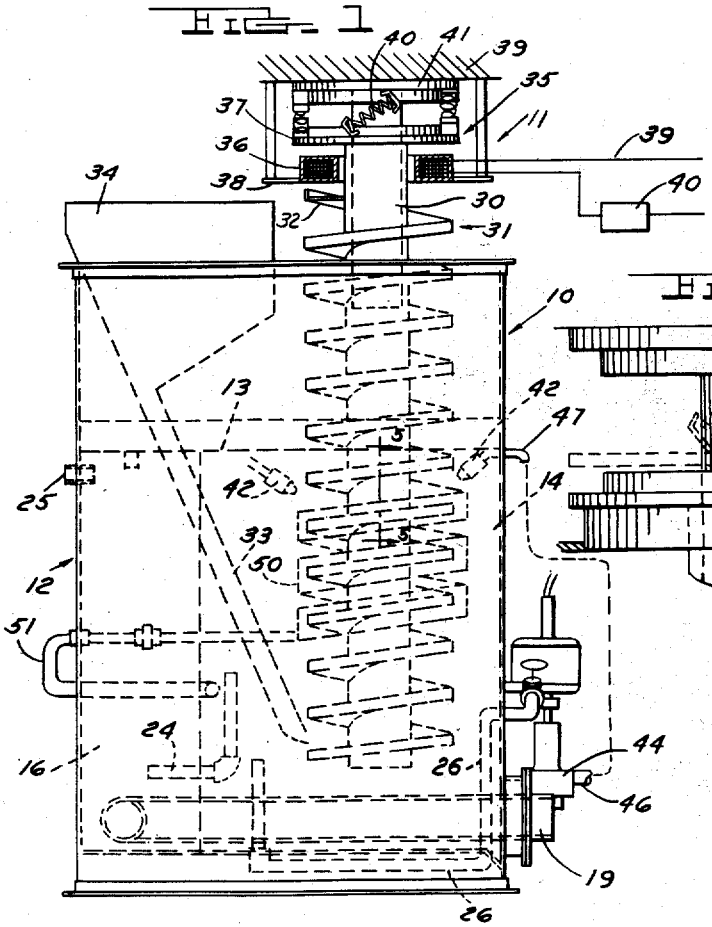
Figure 1 is a semidiagrammatic side elevational view of degreasing apparatus embodying the features of this invention.

The apparatus selected herein for the purpose of illustration is primarily designed for removing grease, oil and/or dirt from relatively small metal parts by the condensing action of a solvent on the surfaces of the parts. In general the apparatus comprises a degreasing unit 10 and a work handling assembly 11. The degreasing unit 10 may be any one of a number of different designs, but is preferably of the type suitable for installation in a relatively small space. One type of degreasing unit highly suitable for the purpose of this invention is shown in detail in the Harry H. Jones et al. application Serial No. 152,052 filed March 27, 1950, and this general type of unit is disclosed herein.

Briefly the unit 10 embodies a metal tank or casing 12 having a partition 13 which extends upwardly from the bottom of the tank intermediate opposite side walls to divide the interior of the tank into two chambers 14 and 15. Upon reference to Figure 3 of the drawings, it will be noted that the chamber 15 extends for the full length of the tank adjacent the chamber 14, and is divided into two compartments 16 and 17 by a partition 18.

The chamber 14 is open at the top, and is adapted to contain a supply of liquid solvent. The liquid solvent in the chamber 14 is heated within the chamber 14 to a temperature sufficiently high to vaporize the solvent, and this may be accomplished by employing a gas, steam or electrical heating unit. Although this invention is not concerned with the specific type of degreasing solvent used in carrying out the cleaning process, nevertheless, it is preferred to employ one of the chlorinated hydrocarbons such as trichlorethylene or perchlorethylene. Trichlorethylene is particularly suitable, because among other desirable characteristics, it has a relatively low boiling point; and has a specific gravity sufficiently greater than water to assure effective separation of water from the solvent during the water removal stage of the process.

In the present instance the solvent is vaporized by a radiant type of gas combustion burner 19 suitably supported in the chamber 14 at the bottom of the latter. The arrangement is such that the liquid solvent at the bottom of the chamber 14 is heated to the boiling point by the burner 19 and the resulting vapor rises in the chamber 14 to provide a vapor area of substantial depth in this chamber.

Attention is now called to Figure 2 of the drawings, wherein it will be noted that the top of the partition 13 is spaced some distance below the open upper end of the chamber 14 enabling solvent vapor to spill over the top edge of the partition 13 into the space 20 directly above the chamber 15. Supported within the space 20 is a condenser 21 comprising a coiled length of finned tubing suitably supported in the tank and extending for substantially the full length of the chamber 15. The opposite ends of the condenser coils project through one wall of the tank 10 and are respectively connected to a source of cooling medium such as water and to a drain or reservoir.

The above general type of condenser affords an exceptionally large surface area so that the condensing action takes place at a very rapid rate. Hence a relatively low pressure area results in the space 20 above the chamber 15, and solvent vapor from the chamber 14 is drawn into the space 20 over the top edge of the partition 13.

The vapor circulating around the condenser coils is, of course, condensed; and the resulting liquid solvent is collected by a pan 22 suitably supported at the top of the chamber 15, and having a drain 23 which communicates with the compartment 16. The liquid solvent introduced into the compartment 16 eventually passes through the overflow conduit 24 into the compartment 17. It will, of course, be understood that any water that may be present in the liquid solvent drained into the compartment 16 rises to the top of the solvent due to the greater specific gravity of the solvent, and such water is eventually drained out of the compartment 16 by an overflow conduit 25. The liquid solvent accumulating in the compartment 17 eventually returns to the vaporizing chamber 14 through a conduit 26 in order to complete the cycle of operation.

Figure 5:
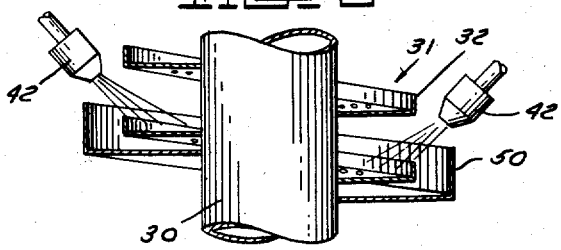
Figure 5 is a sectional view taken on the line 5—5 of Figure 1.

The work feeding assembly 11 is in the form of a vertical spiral conveyor of the vibrating type, and includes a hopper feed for the articles to be cleaned. The spiral conveyor has a vertical support 30 in the form of a tube, and a ramp or pan 31 extends in a spiral around the tube. The ramp is of sufficient width to support the articles to be cleaned on the top surface thereof, and the peripheral edges of the ramp are turned upwardly to form retaining flanges 32. As shown in Figure 5 of the drawings, the work supporting surface of the helical ramp has a multitude of apertures therethrough to enable draining liquid solvent from the ramp back into the chamber 17.

Figure 2:
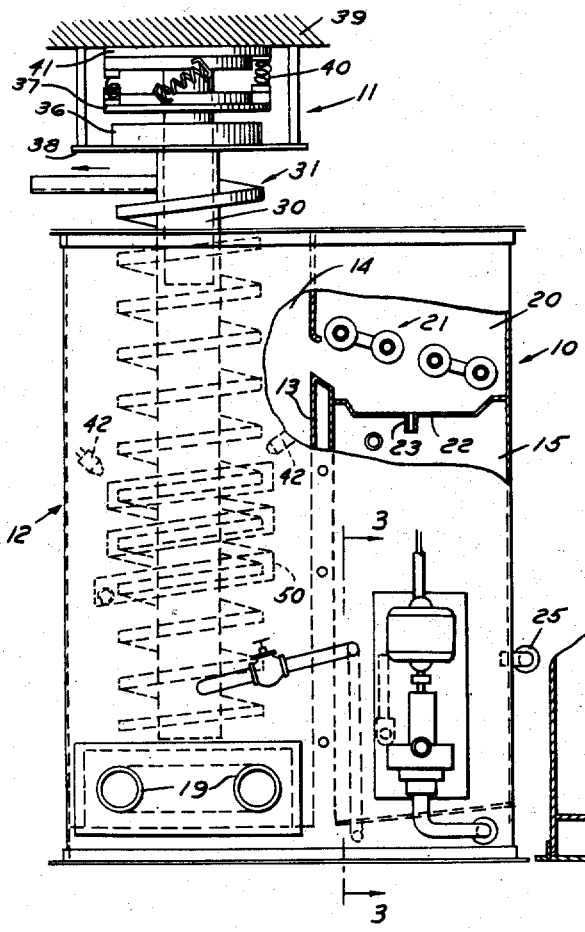
Figure 2 is an end elevational view of the construction shown in Figure 1.

The outside diameter of the ramp is so determined with respect to the size of the opening at the upper end of the vaporizing chamber 14 to enable inserting the ramp into the vaporizing chamber 14 through the open top of the latter, as clearly indicated in Figures 1 and 2 of the drawings. The lower end of the ramp is located adjacent the bottom of the vaporizing chamber 14 well below the normal level of the vapor within this chamber, and communicates with the lower end of a vertically extending chute 33. The upper end of the chute communicates with a hopper 34 which extends through the open top of the vaporizing chamber 14 to a position enabling convenient loading of the articles to be cleaned into the same. The arrangement is such that the articles are fed from the hopper 34 downwardly through the chute 33 and are deposited by the chute under the lower convolution of the ramp 31. The upper end of the ramp 31 is positioned above the open top of the vaporizing chamber 14; and in practice, the aritcles discharged from the upper end of the ramp are received by a conveyor (not shown) which transports the articles to a selected location remote from the degreasing apparatus.

The vertical support 30, together with the ramp 31, is vibrated in a vertical direction by a vibrator 35. In the present instance the vibrator 35 comprises an electromagnet 36 and a ring 37. Electromagnet 36 is mounted on a support 38 below the ring 37, and the support 38 in turn is rigidly connected to suitable frame structure 39 positioned above the tank 10. The coils of the electromagnet are connected in an electric circuit 39, and are periodically energized by a suitable motor driven switch 40. When the electromagnet 36 is energized, the ring 37 is moved downwardly against the magnet; and since the tube support 30 is secured to the ring 37, it follows that the ramp 31 is also moved downwardly. When the circuit to the electromagnet 36 is again opened, the ramp 31 is immediately raised by a plurality of coil springs 40. The coil springs 40 are spaced from each other circumferentially of the ring 37, and have the lower ends connected to the ring 37. The upper ends of the springs are connected to a plate 41, which in turn, is fixed on the frame structure 39.

Figure 4:
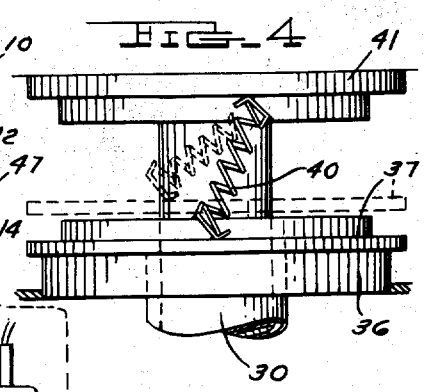
Figure 4 is an enlarged fragmentary side elevational view of the conveyor vibrating means.

As shown particularly in Figure 4 of the [draw-] drawings, the line of action of the springs 40 extend obliquely with respect to the axis of the tube support 30 with the result that the springs impart an oscillating motion to the support 30 as well as the ramp 31 about the vertical axis of the support 30 during vibratory movement of the conveyor. By reason of the combined vibration and oscillatory movement of the conveyor, the articles deposited on the lower end of the ramp 31 are continuously advanced along the helicoidal path of the ramp in an upward direction through the open top of the vaporizing chamber 14. Hence as long as the hopper 34 contains work parts to be cleaned, there is a steady flow of the work parts in an upward direction from the lower regions of the vaporizing chamber 14 through the open top of the latter; and this is highly desirable in that it assures more uniform action of the solvent vapor to clean the parts. In other words the solvent vapor is not subjected to the heavy periodic loads previously caused by manual feeding of the parts into the vapor. Hence the solvent vapor is maintained at the desired uniform cleaning temperature throughout long periods of use. Moreover due to the vibratory action of the conveyor, chips or foreign matter as well as excess solvent are dislodged from the work as it is advanced along the ramp 31. In general the action of the spiral vibrating conveyor greatly enhances the efficiency of the cleaning process.

Figure 3:
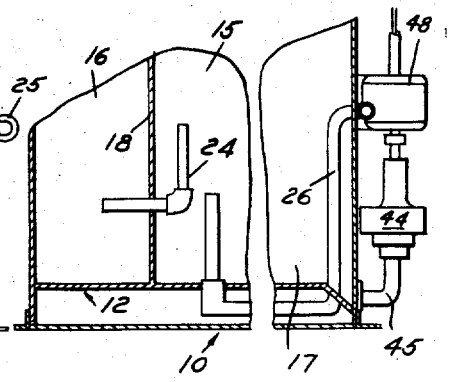
Figure 3 is a sectional view taken substantially on the line 3—3 of Figure 2.

In some cases it is preferred to spray liquid solvent on the work parts as the latter are advanced along the ramp 31. For accomplishing this result a plurality of spray heads 42 are suitably supported within the vaporizing chamber 14 in spaced relationship around the ramp 31. It will be noted from Figure 5 of the drawings that the spray heads are supported to direct liquid solvent downwardly in contact with the work parts supported on the ramp. The liquid solvent is supplied to the spray heads 42 from the solvent storage compartment 17 in the tank 10. As shown in Figure 3 of the drawings a pump 44 is supported at the side of the tank with the intake conduit 45 communicating with the interior of the liquid solvent supply compartment 17. The discharge conduit 46 of the pump 44 (Figure 1) is connected to the spray heads 42 by a conduit 47. The pump 44 is driven by an electric motor 48 suitably mounted on the tank 10.

The liquid solvent sprayed on the work parts drains through the apertures in the ramp and is collected in a pan 50. The pan 50 extends helically about the tube support 30, and is located directly below the spray heads 42 to receive the liquid solvent draining from the adjacent convolutions of the ramp 31. The bottom convolution of the pan 50 is shown in Figure 1 as connected to a drain conduit 51, and if desired, this conduit may be extended to the storage compartment 17 in order to return the excess liquid solvent to this compartment.

What we claim as our invention is:

[1. Apparatus for treating work with a volatile solvent, comprising a chamber adapted to contain a solvent vapor and open at the top, a spiral conveyor extending into the chamber through the open top of the latter to a position below the vapor level in the chamber and having a vertical support, a work carrying ramp mounted on the support and extending helically around the support from a position below the vapor level to a position above the chamber, means for depositing work on the ramp below the vapor level, means on the support above the open top of the chamber for moving the ramp vertically with a vibrating motion, and means also on the vertical support above the open top of the chamber for oscillating the ramp about its vertical axis during vibration of said ramp to advance the articles along the ramp.]

2. The apparatus defined in claim [1] *12* wherein the means for depositing work articles on the ramp comprises a hopper supported at the top of the chamber and a chute leading from the hopper to a position below the vapor level and adjacent said ramp.

3. The apparatus defined in claim [1] *12* having means positioned intermediate the ends of the spiral conveyor and below the open top of the chamber for condensing the solvent vapor as it approaches the top of the chamber.

4. The apparatus defined in claim [1] *12* having means for directing a fluid in a liquid state against the top surfaces of selected convolutions of the ramp.

5. The apparatus defined in claim [1] *12* wherein the convolutions of the ramp are apertured for drainage purposes and wherein means is provided in the chamber for directing a fluid in a liquid state downwardly against the top surfaces of selected convolutions of the ramp.

6. The apparatus defined in claim 5 comprising a drip pan having portions positioned below the said selected convolutions of the ramp for receiving the liquid draining through the apertures in the ramp, and a drain conduit communicating with said drip pan.

[7. Apparatus for treating work with a volatile solvent, comprising a chamber adapted to contain a solvent vapor and open at the top, a spiral conveyor extending into the chamber through the open top of the latter to a position below the vapor level in the chamber and having a vertical support, a work carrying ramp mounted on the support and extending helically around the support from a position below the vapor level to a position above the chamber and having drain openings therethrough, means for depositing work on the ramp below the vapor level in the chamber, means on the vertical support above the open top of the chamber for moving the ramp vertically with a vibrating motion, means also on the vertical support above the open top of the chamber for oscillating the ramp about its vertical axis during vibration of said ramp to advance the articles along the ramp, and a drip pan extending helically around the support for a limited distance intermediate the ends of the latter and having the convolutions thereof respectively positioned between adjacent convolutions of the ramp to receive drainage from the ramp.]

8. The apparatus defined in claim [7] *13* having means in the chamber for directing a fluid in a liquid state downwardly toward the convolution of the ramp adjacent the top of the drip pan, and means communicating with the bottom convolution of the drip pan for receiving fluid collected by said drip pan.

9. The apparatus defined in claim [7] *13* having means for directing the solvent in a liquid state downwardly toward the convolution of the ramp adjacent the top of the drip pan and having a storage compartment for the liquid solvent, and a communication between the liquid storage compartment and the lower end of the drip pan.

10. The apparatus defined in claim 9 having means establishing communicating between the liquid solvent storage compartment and the chamber for returning liquid solvent to said chamber, and heating means embodied in the chamber below the spiral conveyor for heating the liquid solvent to the vaporizing temperature.

11. Apparatus for treating work with a volatile solvent, comprising a chamber adapted to contain a supply of the solvent and being open at the top, a spiral conveyor extending into the chamber through the open top of the latter to a position adjacent the bottom of the chamber and having a vertical support, a work carrying ramp mounted on the support and extending helically around the support from a position adjacent the lower end of the support to a position above the open top of the chamber, means for depositing work on the ramp adjacent the lower end of the latter, means on the vertical support above the open top of the chamber for moving the ramp vertically with a vibrating motion, means also on the vertical support above the open top of the chamber for oscillating the ramp about its vertical axis during vibration of said ramp to advance the articles along the ramp, and heating means for the solvent supported within the chamber below the lower end of the spiral conveyor.

*12. Apparatus for treating work with a fluid, comprising a chamber adapted to contain a fluid and open at the top, a spiral conveyor extending into the chamber through the open top of the latter to a position below the fluid level in the chamber and having a vertical support, a work-carrying ramp mounted on the support and extending helically around the support from a position below the fluid level to a position above the chamber, means for depositing work on the ramp below the fluid level, means on the support above the open top of the chamber for moving the ramp vertically with a vibrating motion, and means also on the vertical support above the open top of the chamber for oscillating the ramp about its vertical axis during vibration of said ramp to advance the articles along the ramp.*

*13. Apparatus for treating work with a fluid, comprising a chamber adapted to contain a fluid and open at the top, a spiral conveyor extending into the chamber through the open top of the latter to a position below the fluid level in the chamber and having a vertical support, a work-carrying ramp mounted on the support and extending helically around the support from a position below the fluid level to a position above the chamber and having drain openings therethrough, means for depositing work on the ramp below the fluid level in the chamber, means on the vertical support above the open top of the chamber for moving the ramp vertically with a vibrating motion, means also on the vertical support above the open top of the chamber for oscillating the ramp about its vertical axis during vibration of said ramp to advance the articles along the ramp, and a drip pan extending helically around the support for a limited distance intermediate the ends of the latter and having the convolutions thereof respectively positioned between adjacent convolutions of the ramp to receive drainage from the ramp.*

References Cited in the file of this patent or the original patent

UNITED STATES PATENTS

| | | |
|---|---|---|
| Re. 22,904 | Carrier, Jr. | Aug. 12, 1947 |
| 973,921 | Dodge | Oct. 25, 1910 |
| 1,078,917 | Gray et al. | Nov. 18, 1913 |
| 1,611,098 | Barner | Dec. 14, 1926 |
| 2,248,662 | Edhofer et al. | July 8, 1941 |
| 2,273,939 | Dammers | Feb. 24, 1942 |
| 2,385,860 | Jesson | Oct. 2, 1945 |
| 2,464,216 | Devol | Mar. 15, 1949 |
| 2,618,577 | Bash | Nov. 18, 1952 |

FOREIGN PATENTS

| | | |
|---|---|---|
| 43,460 | Norway | Nov. 29, 1926 |